(12) United States Patent
Tsirogiannis et al.

(10) Patent No.: US 8,402,016 B2
(45) Date of Patent: Mar. 19, 2013

(54) FETCHING OPTIMIZATION IN MULTI-WAY PIPELINED DATABASE JOINS

(75) Inventors: Dimitrios Tsirogiannis, Toronto (CA); Stavros Harizopoulos, San Francisco, CA (US); Mehul A. Shah, Saratoga, CA (US); Janet L. Wiener, Palo Alto, CA (US); Goetz Graefe, Madison, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 491 days.

(21) Appl. No.: 12/473,065

(22) Filed: May 27, 2009

(65) Prior Publication Data

US 2010/0306212 A1    Dec. 2, 2010

(51) Int. Cl.
  *G06F 7/00*  (2006.01)
  *G06F 17/30*  (2006.01)
(52) U.S. Cl. ........................................ 707/714; 707/719
(58) Field of Classification Search .................. 707/714, 707/716, 718, 719, 793
See application file for complete search history.

(56) References Cited

U.S. PATENT DOCUMENTS

| | | | |
|---|---|---|---|
| 5,544,355 A | | 8/1996 | Chaudhuri |
| 5,794,229 A | * | 8/1998 | French et al. ........................ 1/1 |
| 5,970,490 A | | 10/1999 | Morgenstern |
| 6,493,701 B2 | | 12/2002 | Ponnekanti |
| 6,567,802 B1 | | 5/2003 | Popa et al. |
| 7,054,852 B1 | * | 5/2006 | Cohen ..................................... 1/1 |
| 7,685,193 B2 | * | 3/2010 | Cohen ........................... 707/714 |
| 2007/0208690 A1 | * | 9/2007 | Schneider et al. ................. 707/2 |

OTHER PUBLICATIONS

Ailamaki et al. "Weaving Relations for Cache Performance" 2001, Proceedings of the 27th VLDB Conference, 12 Pages.*
Shah, Mehul A. et al: "Fast Scans and Joins using Flash Drives"; Jun. 13, 2008; p. 17-24; Data Management on New Hardware; Vancouver, Canada;  http://www.cse.ust.hk/damon2008/proceedings/p17-shah.pdf.

* cited by examiner

*Primary Examiner* — James E Richardson

(57) ABSTRACT

A method of performing a multi-way join of a plurality of database relations includes executing a plurality of pipelined two-way joins with the database relations. Each two-way join has two sequential phases. In the first phase, missing attributes of the input relations that are required to evaluate a joining criterion specific to said two-way join are fetched from a non-volatile memory device, and the input relations are joined according to the criterion. In the second phase, any additional missing attributes of the input relations are fetched from the non-volatile memory device as assigned by an optimization process executed prior to commencing the multi-way join.

26 Claims, 8 Drawing Sheets

┌─ 202                                    ┌─ 210

206   208                          214   216

| R1 | A | 10 |                    | R1 | B | AT |
     | R2 | B | 20 |                    | R2 | C | BF |
     | R3 | C | 30 |                    | R3 | F | VG |
     | R4 | D | 40 |                    | R4 | F | TY |
     | R5 | E | 50 |                    | R5 | G | PO |
     | R6 | F | 60 |

Relation 1                         Relation 2

┌─ 218

222  224  226

| R1 | B | 20 | AT |
          | R2 | C | 30 | BF |
          | R3 | F | 60 | VG |
          | R4 | F | 60 | TY |

Joined Relation

*Fig. 2*

FETCHING OPTIMIZATION IN MULTI-WAY PIPELINED DATABASE JOINS

BACKGROUND

Voluminous amounts of data are often stored in databases. As the amount of information stored in various forms of databases increases, the complexity of managing such databases increases. Database management systems (DBMS) employ several algorithms, methods, and functions to manage the data. These functions may include queries, updates, and materialized view maintenance. As processing resources are often limited, it is imperative that a DBMS utilizes efficient algorithms.

Database joins are a critical component of the DBMS operations. A database query will often contain multiple joins. The faster the joins can be computed, the more efficiently the DBMS can manage the data.

Databases may use different types of storage media for data storage. Traditionally, disk drives have been used to store data. These disk drives are most efficient when data is being read or written sequentially. Solid state drives (SSD's) are beginning to replace many traditional disk drives. SSD's are able to perform reads randomly at a comparable rate to sequential reads on a disk drive. It is important that the software algorithms used by a DBMS are developed to best utilize the hardware to which the database is using.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 2 is a diagram of two illustrative database relations and the join of the relations based on a common attribute, according to one exemplary embodiment of the principles described herein.

Throughout the drawings, identical reference numbers designate similar, but not necessarily identical, elements.

DETAILED DESCRIPTION

A join is a fundamental operation in relationship algebra used to combine records from two relations in a relational database, the combination usually being based on common attributes in the two relations. The newly created relation is often referred to as a joined relation. A multi-way join is a combination of records from more than two relations in a relational database, the combination also being based on matching attributes in each relation.

Database management systems typically use a generic join method such as a hash-join, grace-join, sort-merge join, index-nested-loop join, or other join method. Often these join methods entail fetching all of the attributes of the joining relations from a hard disk drive into faster, volatile memory prior to performing the join operation. This is done because disk drive efficiency is only maximized when reading or writing is done sequentially. Thus, these join methods are optimized to work with the characteristics of standard disk drives.

The present specification describes methods and systems for computing multi-way pipelined joins in relational databases stored in non-volatile memory storage with fast page-based random access. With fast random access storage devices, the present methods and systems may exhibit significant savings in processing resources over conventional join methods.

As used in the present specification and in the appended claims, the term "relation" is defined as a table of database values.

As used in the present specification and in the appended claims, the term "materialize" is defined as the process of fetching data from a database structure stored in nonvolatile memory and creating an instance of the data in faster cache memory.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The systems and methods of the present specification may be embodied entirely as hardware, as hardware configured to execute software, or as one or more computer program products embodied on one or more computer readable computer media. Such computer media may include volatile and/or involatile memory, including, but not limited to, hard disk drives, dynamic RAM, flash memory, solid state disk drives, and the like.

Figure 1:
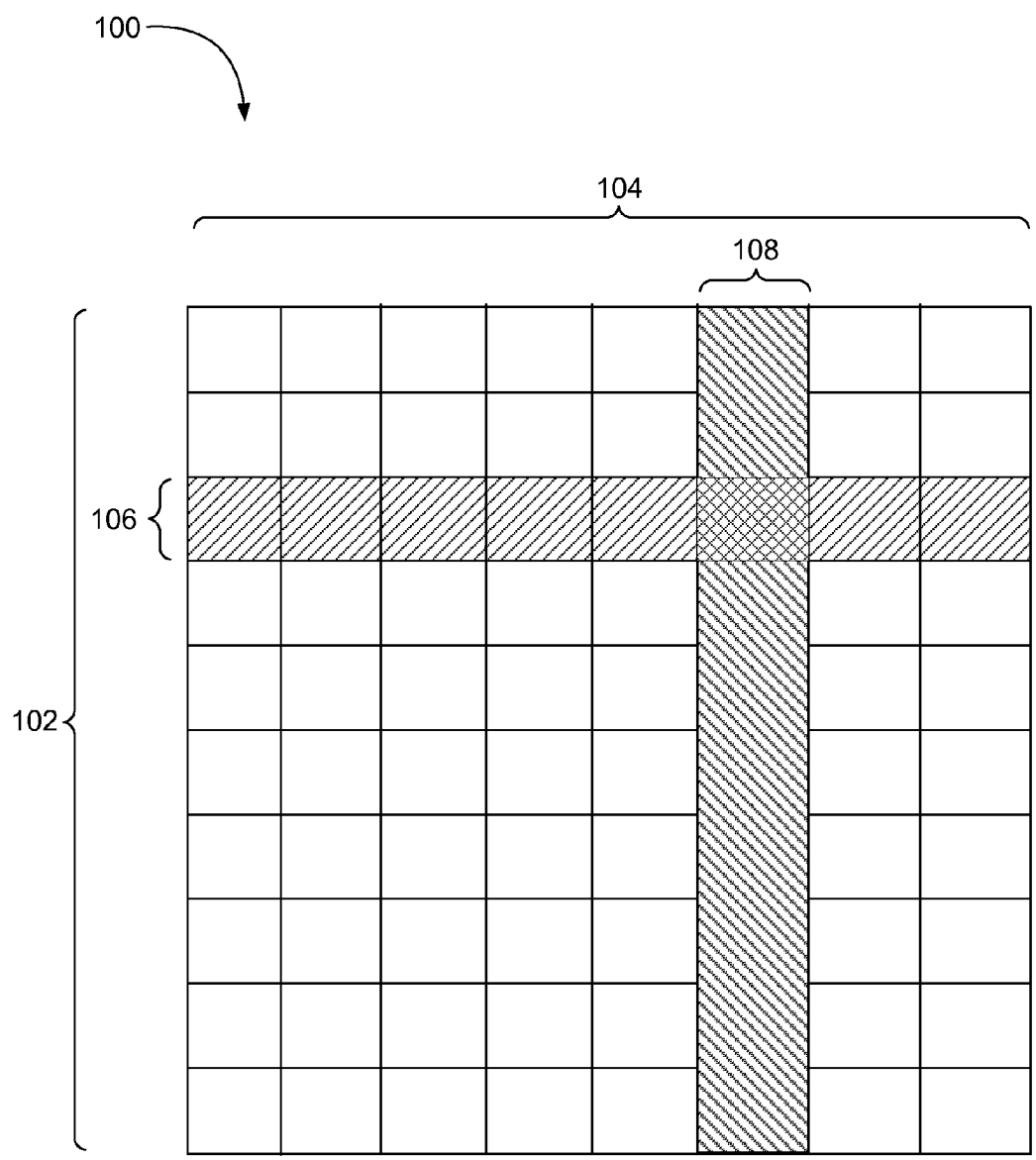
FIG. 1 is a diagram of an illustrative database relation, according to one exemplary embodiment of the principles described herein.

FIG. 1 shows an illustrative depiction of a database relation (100). A relation is a table structure, data being stored in that structure. A relation consists of rows (102) and columns (104). Each row consists of a set of values referred to as a tuple (106). Throughout this specification, a tuple will refer to the set of values contained within a row. Each column consists of a set of specific values referred to as attributes (108). The number of columns in a database relation may be constrained to a predetermined number; however the number of rows is generally variable. In some applications, the number of rows in a database relation may dynamically range from only a few rows to hundreds or thousands of rows.

FIG. 2 is a diagram of two exemplary relations and the equi-join result of those two relations based on a common attribute. An equi-join is a join method that uses only equality comparisons in the join-predicate. In the example depicted by FIG. 2, relation 1 (202) and relation 2 (210) are joined by comparing the first attribute (206) of each row in relation 1 with the first attribute (214) of each row in relation 2. The computing device running the database management software which performs the join will compare the values contained in the join attributes of both of the relations to see which ones are equivalent. The rows for which there is equivalency will then be joined and compiled to create a new relation (218). In the present example, the query plan (a set of steps and criteria used execute the join) requests all attributes to be present in the join result, the newly created join relation will therefore contain all attributes from both relations. It can be seen from the figure that the only rows in the joined relation (218) are rows that have matching join attributes in relation 1 (202) and relation 2 (210). The letters B, C, and F are the only matches of the first column attributes (206,214). In relation 2 (210), there are two instances of F, therefore the joined relation (218) will have two rows with the value F in the first attribute column (222). After the rows in the joined relation have been determined, the rest of the attributes (208,216) from relation 1 (202) and relation 2 (210) will be added to the joined relation (218). Column 2 (224) in the joined relation (218) contains the attributes from the last column (208) in relation 1 (202). Column 3 (226) in the joined relation (218) contains the attributes from the last column (216) in relation 2 (210).

The join discussed above is merely one example of how a join may work. Depending on the query plan, additional constraints and options may be involved with a particular join, as may best suit a particular application of the principles of the present specification.

Figure 3:
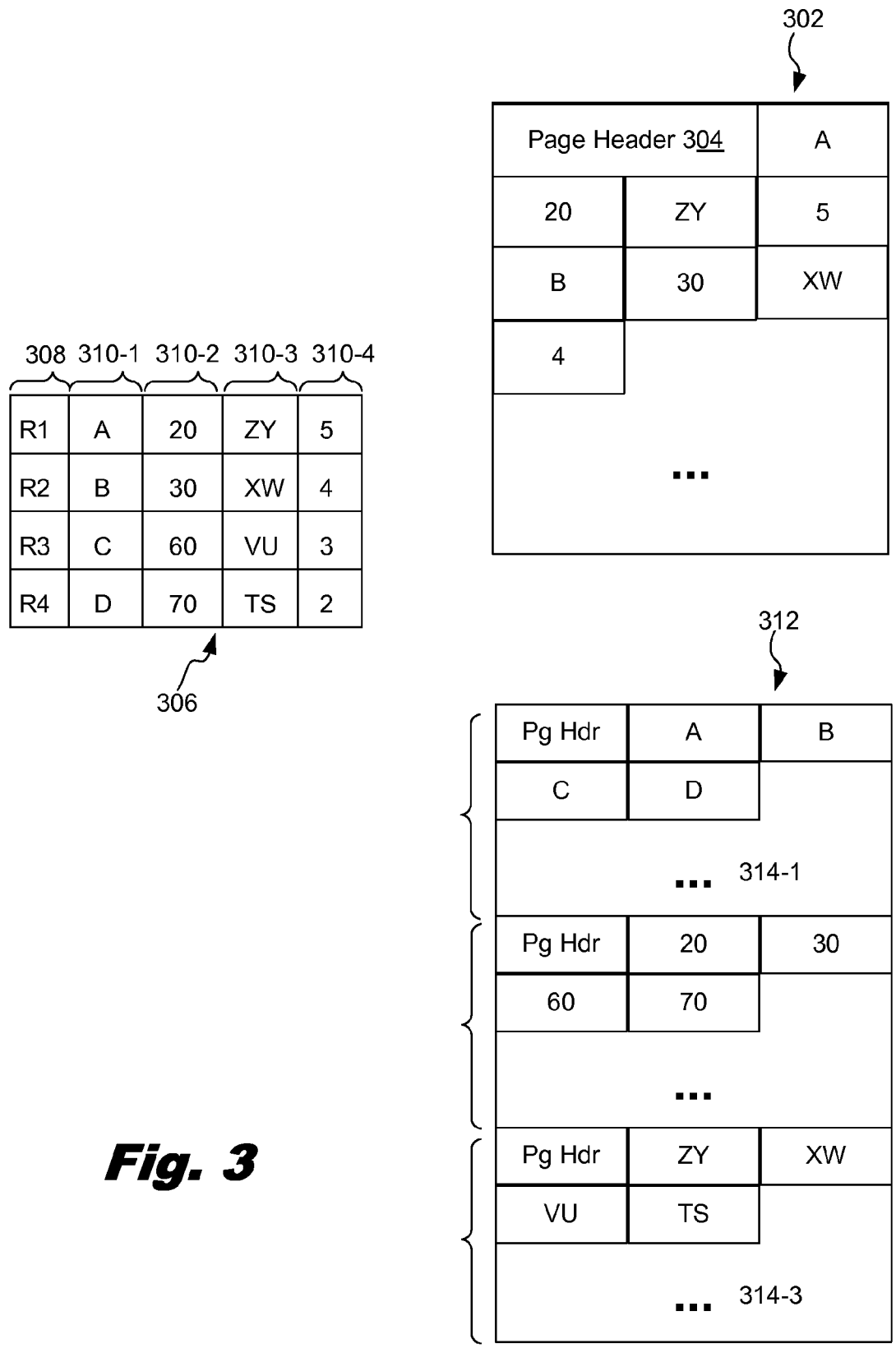
FIG. 3 is a diagram of an illustrative database relation stored on traditional row based memory page layout compared with a column-based mini-page layout, according to one exemplary embodiment of the principles described herein.

The method by which data is laid out in memory may substantially affect the efficiency by which the data is managed according to the particular algorithms used by management software. FIG. 3 compares a standard row-based memory layout (302) with a column-based mini-page layout (312). An exemplary database relation (306) is shown on both types of memory page layout.

The far left column (308) in the database relation (306) lists the row numbers. The rest of the columns (310-1 to 310-4) contain various attributes. The row based layout contains the tuples of the database relation (306) in sequential order on every page. Some relations will be spread over multiple pages, other relations may be small enough to fit in one page. The page starts with a page header (304) and then starts listing all tuples within the relation. The tuple stored in the first row is listed first, and the tuple stored in the second row is listed second. This process will continue until the page fills up, in which case a new page will start to list the tuples. With this layout all tuples are placed contiguously in memory.

A column-based mini-page layout (312) divides a page into smaller pages referred to as mini-pages (314-1 to 314-3). Each mini page places the values of a particular column contiguously in memory. The first mini-page (314-1) would contain the values from the first column (310-1). The second mini-page (314-2) would contain the values from the second column (310-2). This process continues throughout the entire page. Some relations contain a large number of rows and therefore may span several memory pages. If this is the case, each mini-page of a particular page would contain less than all of the values within a particular attribute. The remaining values of each attribute will be placed in mini-pages of a subsequent page or pages. With this layout, attributes are stored contiguously in memory, making it faster to scan attributes. Non-volatile memory with fast random access is ideally suited for storing relations in a column-based mini-page layout. A fast random access makes skipping columns of attributes cheaper than the cost of reading the data being skipped to arrive at a desired attribute sequentially.

Figure 4:
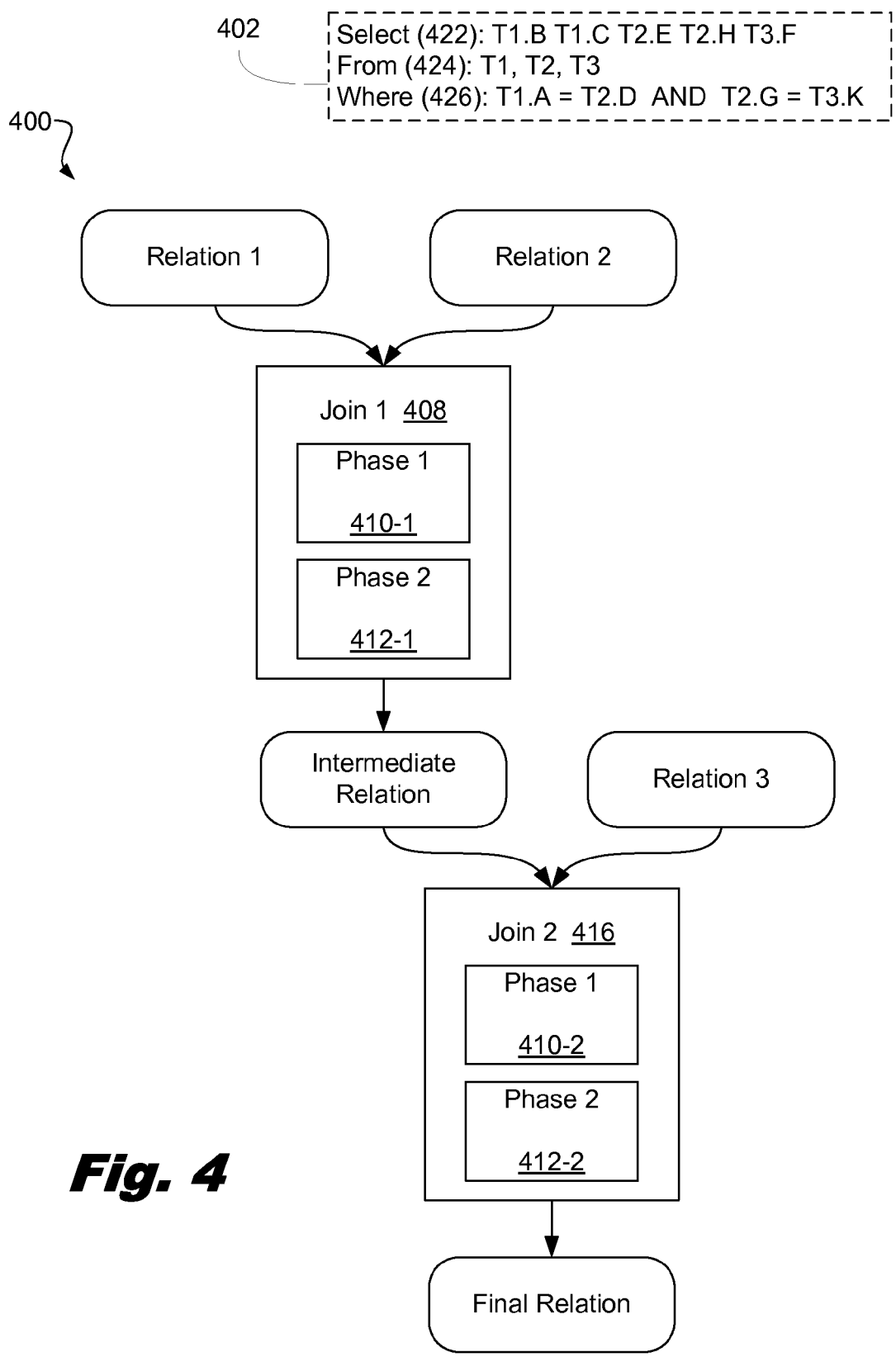
FIG. 4 is a diagram of an illustrative three-way pipelined database join operation, according to one exemplary embodiment of the principles described herein.

FIG. 4 is a diagram depicting the overall process of an illustrative method (400) of performing a multi-way database join. In the present example, a three-way join is implemented as a pipelined series of two-way joins. With any given number of relations needing to be joined, the total number of joins performed is one less than the total number of relations involved in the multi-way join.

The present method (400) illustrates a multi-way join for three relations, relation 1, relation 2, and relation 3 which will be referred to as T1, T2, and T3 respectively. T1 includes attributes A, B, and C. T2 includes attributes D, E, G, and H. T3 includes attributes F, K, and L. An illustration of the query (402) to be executed in a database system, as expressed in a declarative language (e.g., SQL) is shown at the top of the figure. The select command (422) lists the attributes from the set of relations which will be materialized in the final joined relation. For example, T1.B refers to attribute B in relation 1. The attributes which are materialized at the end of the sequence of joins are not necessarily the attributes which are compared for matching values. The from command (424) determines what relations will be involved in the join. The where command (426) determines the specific join criteria. For example, the command T1.A=T2.D means that attribute A of relation 1 and attribute D of relation 2 will both be scanned and rows containing equivalent values in attribute A and attribute D will be determined.

The method (400) begins at a two-way join node (408) of the first two relations. Each two-way join node (408, 416) in the series of joins includes two separate, consecutive operations: a first phase (410-1, 410-2) and a second phase (412-1, 412-2). During the first phase (410-1, 410-2), input is received and a join operation is executed on that input. The input for each first phase (410-1, 410-2) includes attributes from the relations to be joined in that node (408, 416). In certain embodiments, not all attributes of the joining relations need be materialized (fetched from database memory) to complete the join operation of a particular node. Specifically, only those attributes in the joining relations that are compared to each other as part of a join query are needed to complete the join. The remaining attributes of the joining relations may be considered nonessential to performing the join and materialized later on to conserve time, memory, and processing resources.

Accordingly, the input for each first phase (410-1, 410-2) is simply some of the materialized attributes from the joining relations, fetched from database storage. This input includes at least those attributes from the joining relations that are essential to carry out the join operation, and possibly additional nonessential attributes. The input may, in some cases, be provided to the first phase (410-1, 410-2) of a joining node (408, 416) through inheritance; as previous nodes may materialize attributes that are then passed on to subsequent joining nodes (408, 416) through the joining relations. Additionally, the first phase (410-1, 410-2) may directly materialize attributes from the joining relations that are necessary to complete its join operation if those attributes were not materialized in a previous node.

In the present method (400), a traditional join method is executed on the input to the first phase (410-1, 410-2) of each join node (408, 416) during that phase. For example, the first phase of each join node (408, 416) may execute a hash-join, a sort-merge join, an indexed nested loop, a nested loop, and/or any other join method that may suit a particular application of the principles described herein.

During the second phase (412-1, 412-2) of a join node (408, 416) in the present method (400), additional nonessential attributes of the joining relations, which are projected to be essential to the join operation of one or more later join nodes (408, 416) or in the final result may be fetched from the database storage materialized. A determination of which attributes are to be fetched during the second phase of any join node (408, 416) may be determined before the multi-way join begins by an optimization module. The optimization module may determine the most cost-effective point at which an attribute can be fetched from the non-volatile storage. A detailed description of how these attributes are assigned to be fetched during a particular phase of a particular node is given below. The set of attributes materialized during the second phase (412-1, 412-2) may range from an empty set of all nonmaterialized attributes in the result of the join executed in the first phase (410-1, 410-2).

The attributes assigned to be fetched during a specific phase of a node may be fetched from nonvolatile memory in a sequential order or according to any other algorithm that may best suit a particular application of the principles described herein.

The completion of both phases (410-1, 410-2; 412-1, 412-2) of a join node (408, 416) produces an intermediate relation that is then passed on as input to the subsequent join node (408, 416), unless the current join node (408, 416) is the last in the sequence of pipelined nodes (408, 416), in which case a final relation is produced. All attributes in the final relation will have been materialized at least by the end of the second phase (412-2) of the final join node (416). Upon completion of the method (400), the final relation may, in some embodiments, be written to a designated location of the nonvolatile storage device from which the database relations were read.

The present method (400) may be particularly advantageous with database relations stored in a column-based mini-page layout in non-volatile storage having fast random page access as described above. A practical example of such a storage device is a NAND Flash-based solid state drive, but the present methods and systems may be advantageously applied to any non-volatile technology having fast random page access, including, but not limited to, PCRAM, FeRAM, MRAM, NRAM, and the like. As explained above, a fast random page access together with column-based mini page format allows for a reduction in access time by skipping over unwanted columns when the time it takes to skip (i.e., perform a random access) is less than the time it takes to read the data being skipped sequentially to arrive at desired data. The methods and systems described in the present specification take advantage of this feature by storing the database relations in nonvolatile memory with fast random access and skipping over columns that are not immediately needed to access columns as they are needed.

Though FIG. 4 depicts a three-way join, a multi-way join of any number of relations may be processed using the process described above. The number of joins processed will be one less than the number of relations involved in the join process as specified by the query plan.

Figure 5:
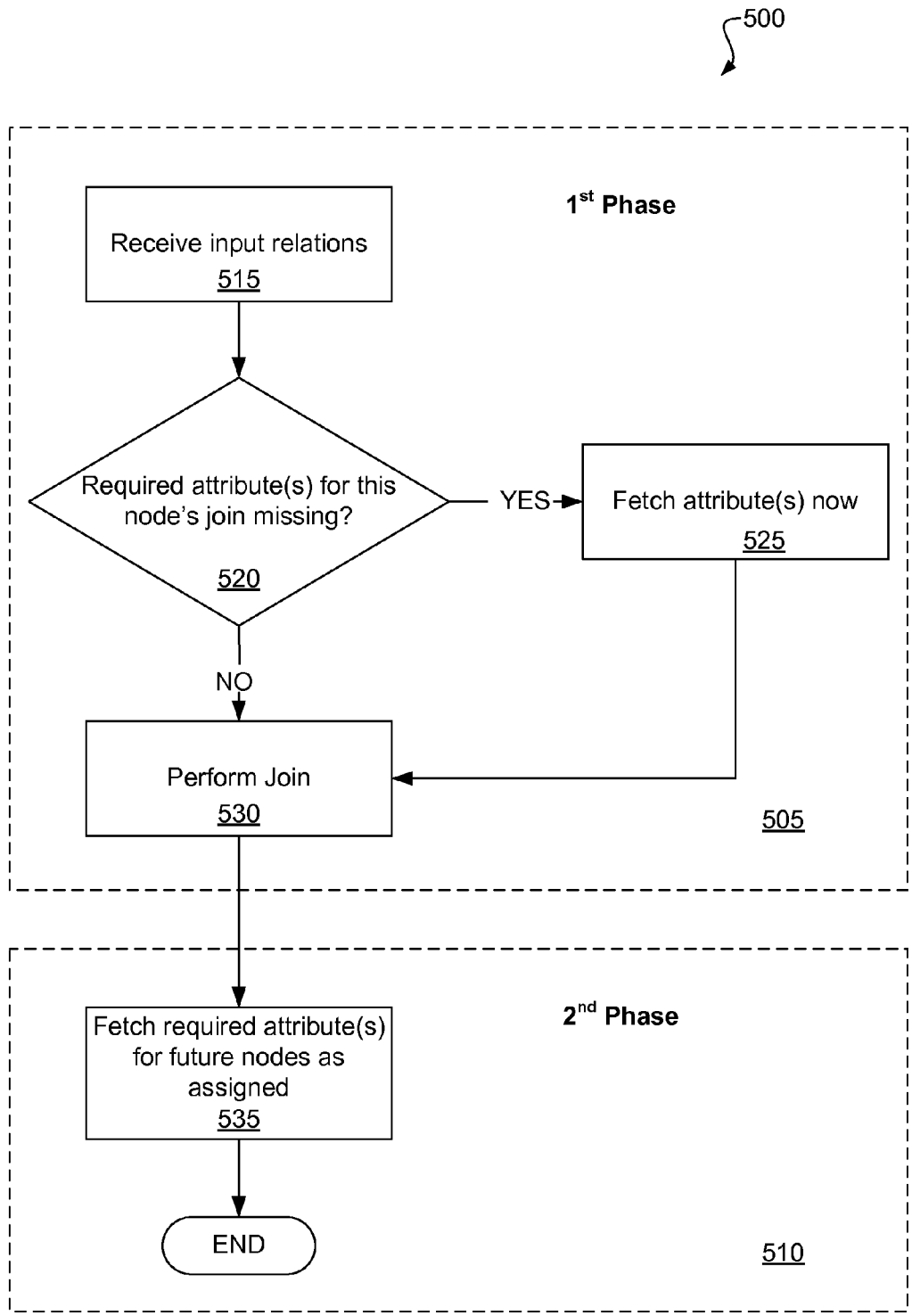
FIG. 5 is a flow diagram of an illustrative join process at a node of a pipelined database join operation, according to one exemplary embodiment of principles described herein.

FIG. 5 is a flow diagram depicting an illustrative process (500) that may be performed during the first phase (505) and the second phase (510) of each join node (408, 416; FIG. 4) during a multi-way join consistent with the principles of the present specification.

During the first phase (505), the input relations to be joined at the current node are received (step 515). In the first node of a multi-way join, both of these input relations will be obtained directly from the database(s) stored in nonvolatile memory. In all other nodes of the multi-way join, one input relation will be the result of the previous join node and a relation obtained directly from the database(s) stored in nonvolatile memory. As used herein, receiving or obtaining a relation directly from the database in nonvolatile memory is specifically defined as allocating space in cache memory for each attribute in the relation without necessarily yet materializing any of the attributes stored by the relation.

After the input relations have been received (step 515) in the first phase (505), a determination may be made (decision 520) as to whether any attributes of either of the joining relations are necessary to perform the join and have not yet been materialized. If so, those attributes are fetched and materialized (step 525) from nonvolatile memory. Whether or not additional attributes are fetched (step 525) in the first phase (505), the join is performed (step 530) on the input relations. This join may be performed using any join algorithm that best suits a particular application of the principles described herein.

After the first phase (505) has been completed, the join node (408, 416; FIG. 4) enters a second phase (510), in which attributes that will be required by future nodes may be fetched (step 535) as assigned by an optimization module that analyzes the multi-way join prior to the commencement of the first join node (408, FIG. 4). These attributes may be components of the final result of the join performed (step 530) in the first phase (505), and therefore be passed on as input to the next join node (408, 416; FIG. 4) in the multi-way join. However, depending on the specific multi-way join being performed, in certain embodiments the optimization module may not assign any attributes to be fetched (step 535) during the second phase of a particular join node (408, 416).

Figure 6:
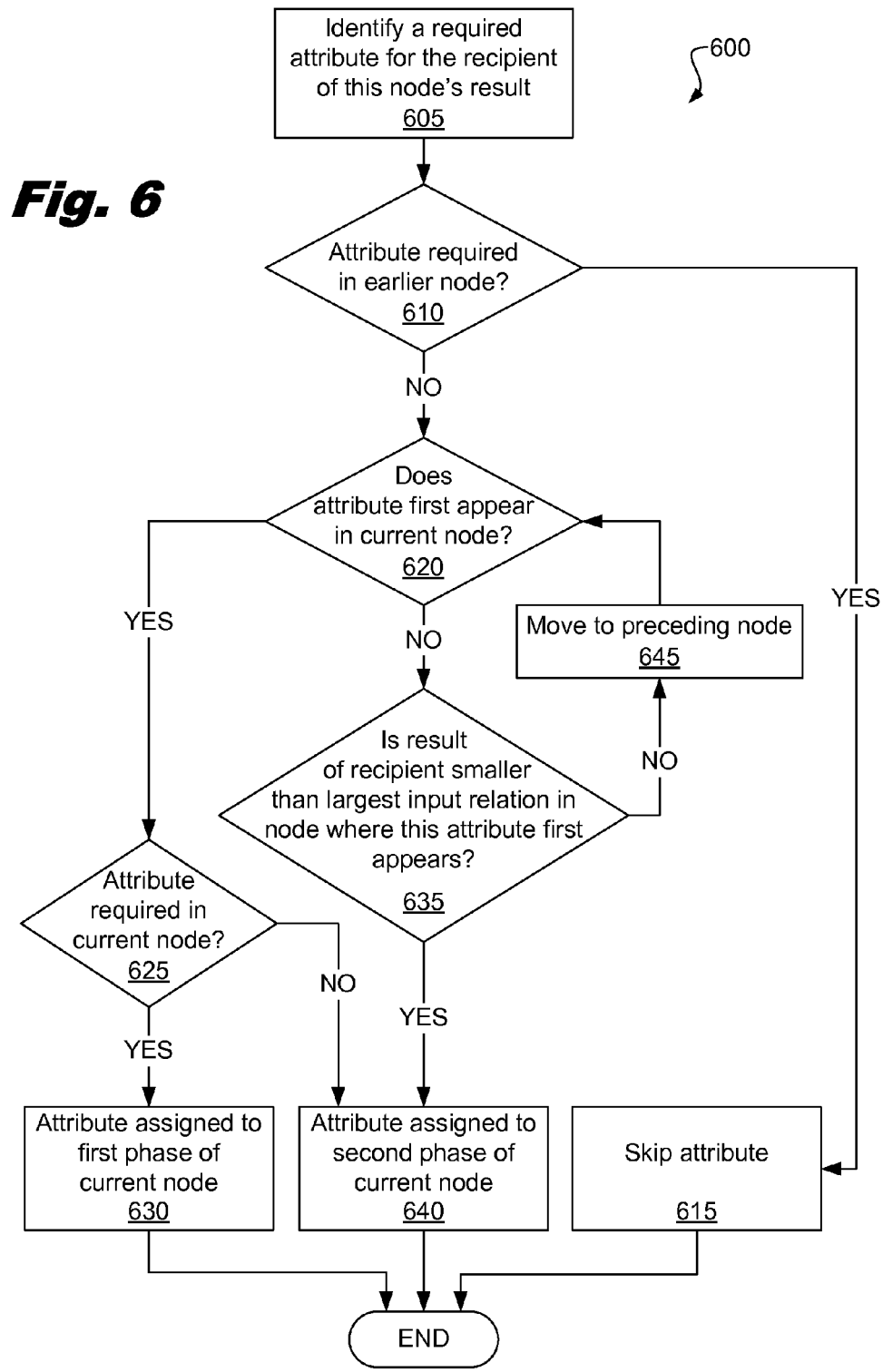
FIG. 6 is a flow diagram of an illustrative method of assigning the fetching of a specific database attribute to a specific phase of a node in a pipelined multi-way join, according to one exemplary embodiment of the principles described herein.

Referring now to FIG. 6, a flow diagram illustrating in more detail the functionality of the optimization module is shown. Specifically, the flow diagram shows an illustrative method (600) of determining when to fetch and materialize an attribute during a multi-way join consistent with the principles described herein.

This method (600) may be performed for each attribute involved in a multi-way join to assign the materialization of that attribute to an optimal join node and phase thereof. As such, the method (600) may be performed for each attribute after an order has been determined for joining the relations of the multi-way join, but prior to the commencement of the multi-way join. The method (600) is designed to be executed first for each of the attributes corresponding to the last join node of the multi-way join and work its way backwards through the unassigned attributes corresponding to previous join nodes until reaching the first join node.

The method (600) commences by identifying (step 605) a necessary attribute for the recipient of the result of the present node. The recipient of the last node's result is defined as the consumer of the final product of the multi-way join. Accordingly, all attributes are required for the recipient of the result of the last node. In cases other than that of the last node, the recipient of the result of the present node is defined as the join node immediately following the present node in the pipeline of the multi-way join.

If it is determined (decision 610) that the attribute required by the recipient of the present node's result is also required by an earlier node, the present attribute is skipped (615) and evaluated at an earlier node in the pipeline. Otherwise, an evaluation is made (decision 620) as to whether the attribute first appears (i.e., is a component of a relation) in the present node. If so, this attribute is assigned (step 630) to be fetched and materialized during the first phase of the current node if that attribute is required (decision 625) for the join of the current node or assigned (step 640) to be fetched and materialized during the second phase of the current node if that attribute is not required (decision 625) for the join of the current node.

If the attribute does not appear first in the present node, an evaluation is made (decision 635) as to whether the result of the recipient of the result of the current node is smaller than the largest input relation in the node where this attribute first appears. If so, the attribute is assigned (step 640) to the second phase of the current node. Otherwise, the method moves (step 645) to the preceding node in the pipeline and flow returns to decision block 620 for evaluation with respect to the new position in the pipeline.

The materialization strategy illustrated in the present method (600) exhibits a number of advantages over traditional join methods. In the present method (600), materialization decisions are always based on the cost of fetching an attribute. Suppose that |V| is the total size in bytes of the attribute(s) that are to be fetched from a given relation (i.e., the number of pages that contain these attributes multiplied by the size of a page). A pre-join fetching strategy, as performed by traditional join methods, would result in a cost of |V| in a 1-pass joining algorithm and 3|V| for a 2-pass joining algorithm. If these attributes are pipelined from a previous node, then the pre-join fetching cost is 0 for 1-pass joins and 2|V| for 2-pass joins. Post-join fetching strategies have a cost of σ|V| for 1-pass joins and 2|R|+σ|V| for 2-pass joins, where σ is the fraction of pages that participate in the result and |R| is the total size of the result for that joining node, in bytes. Because |R| grows as additional attributes are fetched with the post-join fetching strategy, post-join fetches should be ordered according to the increasing size of attributes.

Based on these costs, the present methods compute for every attribute the total cost for the path of joins through which an attribute will pass, and selects the strategy with the least cost. Since different attributes may share common paths, the best overall strategy involves solving an optimization problem which includes all the costs for all attributes. The present inventors have found that the heuristic approach described in FIG. 6 for optimizing the assignment of attribute fetching to a specific phase of a specific node works well to achieve this goal.

Figure 7:
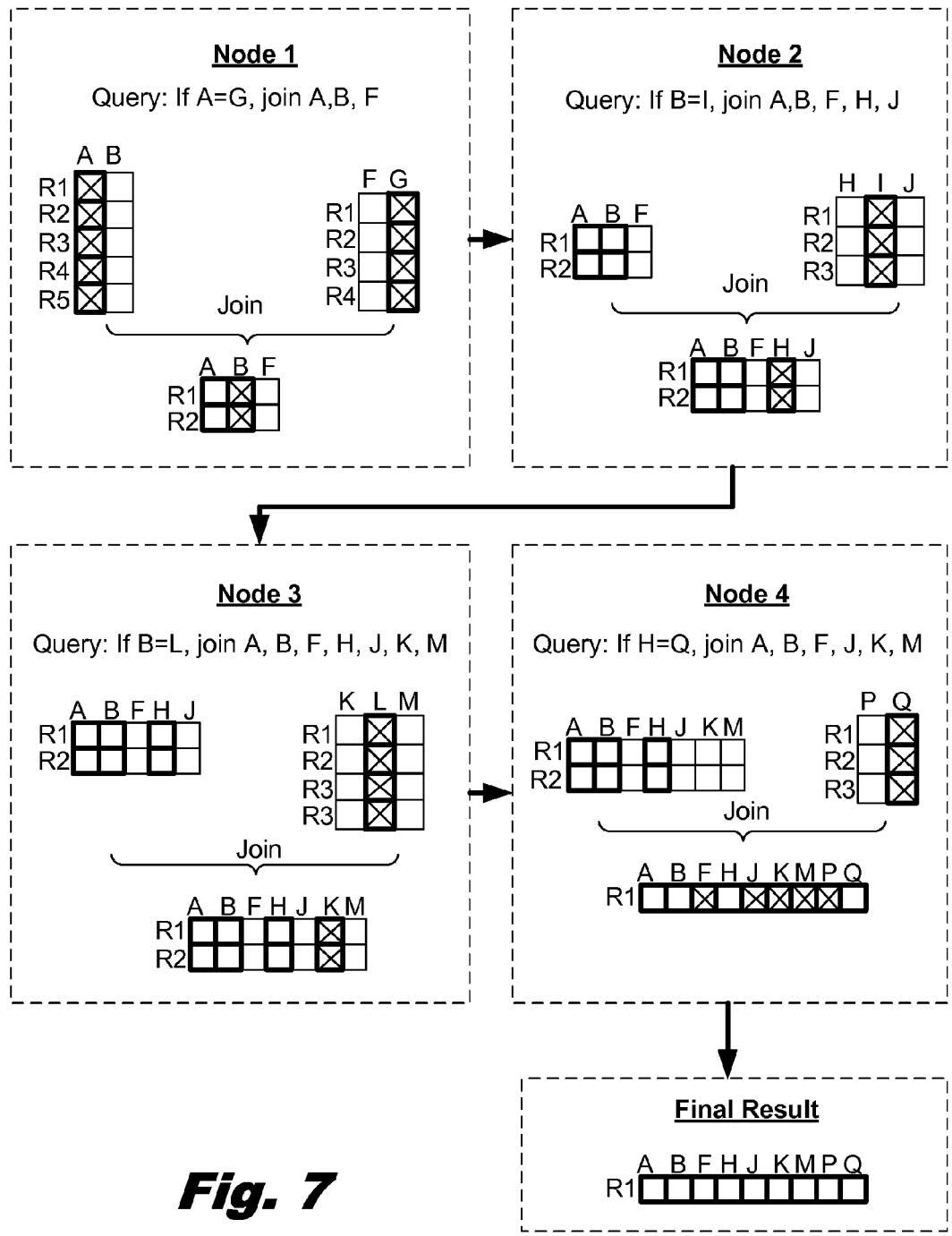
FIG. 7 is a diagram of assigned database attribute fetching in an illustrative multi-way pipelined database join, according to one exemplary embodiment of the principles described herein.

Referring now to FIG. 7, a diagram of an illustrative multi-way join pipeline (700) is shown. The pipeline (700) of the present example includes 4 join nodes. The assignments of the materialization of attributes in the relations of each join node, according to the method described in relation to FIG. 6, are marked with "X" characters. Attributes is shown to materialize before the join operation of a node is assigned to be fetched and materialized in the first phase of that join node, while those shown to materialize after the join operation are assigned to the second phase of the join node. For example, in node 2, attribute I is assigned to be fetched and materialized in phase 1, while attribute H is assigned to be fetched and materialized in phase 2.

Some brief examples of the execution of the method (600) described in FIG. 6 will now be given within the context of the multi-way join pipeline (700) illustrated in FIG. 7. To review, the method (600) is executed at least once for each attribute necessary to the multi-way join, beginning with the attributes of the last node (in this case, Node 4), and progressing backward in the pipeline through the unassigned attributes until reaching Node 1.

In a first example, the assignment of attribute 'F' will be examined. Because attribute 'F' is present in Node 4, the method (600) will be executed for attribute 'F' while Node 4 is evaluated. Attribute 'F' is present in the final result of the multi-way join, so 'F' is a required attribute for the recipient of the result of Node 4, per block 605. Attribute 'F' is not required in any of the join queries of the preceding nodes per block 610, so flow moves to an evaluation of whether 'F' first appears in the current node per block 620. Since 'F' appears first in Node 1, flow moves to an evaluation per block 635 as to whether the result of the recipient is smaller than the largest input relation of the node where 'F' first appears. The result of the recipient of Node 4 is simply the final result, which is a 1×9 relation. This 1×9 relation is smaller than the 2×5 relation of Node 1, where 'F' first appears, so 'F' is assigned to be materialized in the second phase of Node 4.

In another example, the assignment of attribute 'B' will be explained. Attribute 'B' is also present and necessary in Node 4, so the method (600) will be executed for attribute 'B' when Node 4 is evaluated. However, because 'B' is required in earlier nodes (Nodes 2 and 3), per decision 610, 'B' is not assigned during the evaluation of Node 4 per block 615. When assignments are made for the unassigned attributes of Node 2, the method (600) will be executed again for attribute 'B' and the assignment of 'B' will again be skipped per block 615. When Node 1 is evaluated, the method (600) will be executed a third time with respect to attribute 'B'. During this execution, it will be determined that 'B' is not required in an earlier node per decision 610, and that the attribute does not first appear in the current node per decision 620. As such, upon a determination that the 2×4 relation produced by Node 2 is smaller than the 2×5 input relation of Node 1, where attribute 'B' first appears, the fetching and materialization of attribute 'B' will be assigned to the second phase of Node 1.

Figure 8:
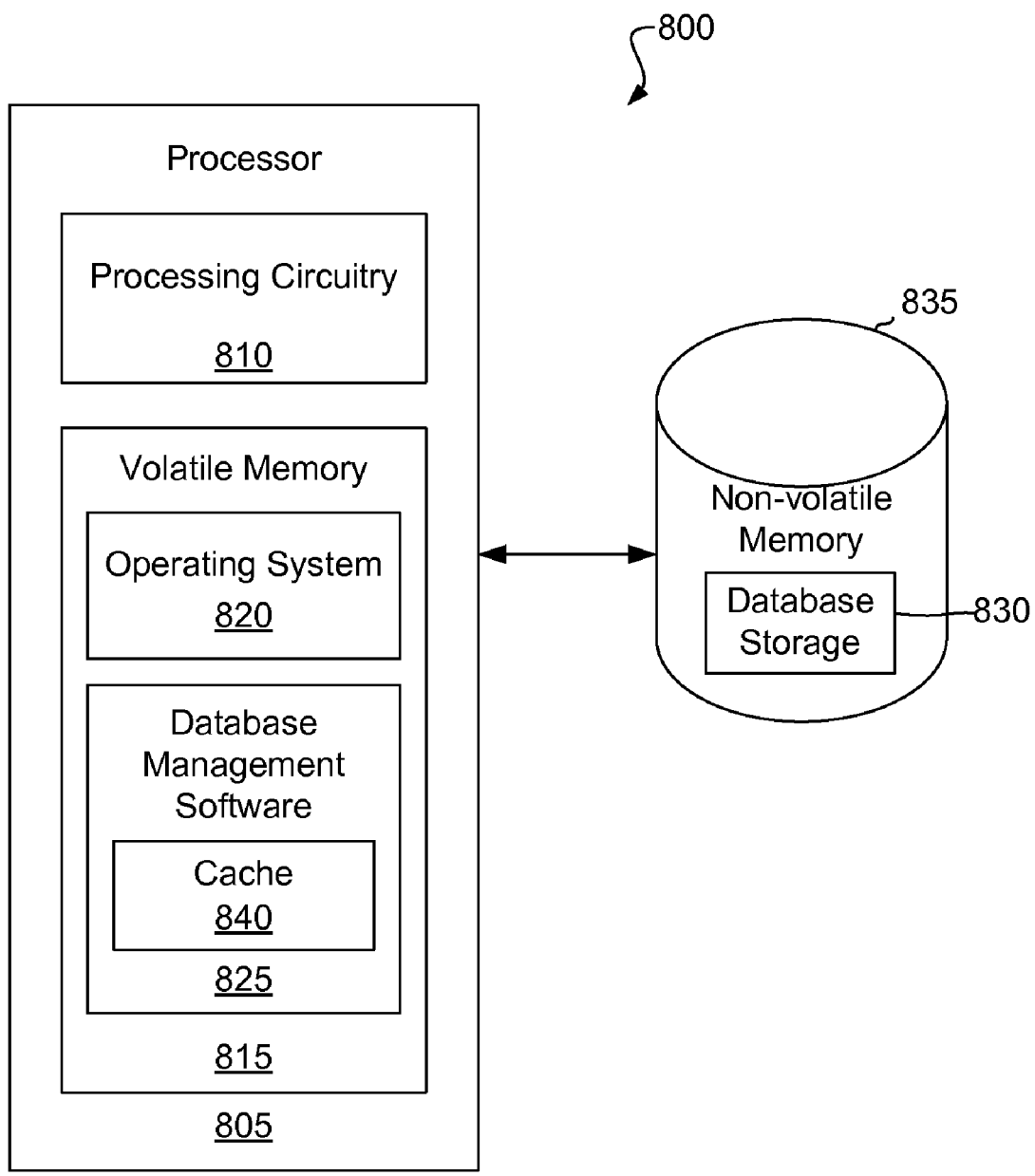
FIG. 8 is a block diagram of an illustrative system for performing a multi-way pipelined database join, according to one exemplary embodiment of the principles described herein.

Referring now to FIG. 8, a block diagram is shown of an illustrative system (800) for performing a multi-way join according to the principles described herein. The system (800) may include a processor (805) having processing circuitry (810) in communication with volatile memory (815). The volatile memory (815) may be configured to store software for the processing circuitry (810) to execute, including an operating system (820) and database management software (825).

The database management software (825) may be configured to cause the processor (805) to manipulate one or more databases (830) stored in non-volatile memory (835) that is communicatively coupled to the processor (805). For example, the database management software (825) may be configured to perform any of the methods described in the present specification for optimizing and executing multi-way joins in the databases (830). The database management software (825) may include and/or have access to a cache (840) of volatile memory (815) to store data fetched from the databases (830) (including the relations used in a multi-way join).

In certain embodiments, the non-volatile memory (835) may be controlled by the processor (805). For example, the processor (805) may be a server and the non-volatile memory (835) may include a solid state disk drive directly connected to the processor (805). Alternatively, the non-volatile memory (835) may be independently managed and accessible to the processor (805) over a network or other line of communication.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of performing a multi-way join of a plurality of database relations, comprising:
    executing a plurality of pipelined two-way joins with said relations, each said two-way join comprising a first phase and a second phase;
    in which said first phase of each said two-way join comprises:
        materializing from a non-volatile memory device any missing attributes in input relations that are required in a joining criterion specific to said two-way join and have not been materialized; and
        joining said input relations according to said criterion; and in which said second phase of each said two-way join comprises:
    materializing from said non-volatile memory device any additional missing attributes in said input relations as assigned by an optimization process executed prior to commencing said multi-way join,
    in which the attributes in the relations are assigned to be materialized at one of the first phase and second phase of the two-way join based on whether the attributes are required for the recipient of the two-way join's result and based on whether the current two-way join requires the attributes, and
    in which the missing attributes comprise any attributes that are required for the result of the two-way join and have not been materialized.

2. The method of claim 1, in which said database relations are stored on said non-volatile memory device in a column-based mini page format.

3. The method of claim 1, in which said optimization process is configured to individually assign each attribute in said database relations to be fetched during one of said first and second phases in one of said two-way joins according to a computed minimum time cost in fetching said attribute.

4. The method of claim 1, in which said optimization process is configured to order fetches according to attribute sizes at each two-way join.

5. The method of claim 1, in which said non-volatile memory device comprises at least one solid state drive.

6. The method of claim 1, in which said joining said input relations according to said criterion comprises performing at least one of: a hash-join, a sort-merge join, an indexed nested loop, and a nested loop on said input relations.

7. The method of claim 1, in which materializing comprises fetching said missing attributes into an instantiation of said database relations stored in volatile memory.

8. The method of claim 1, further comprising writing a final result of said plurality of pipelined two-way joins to said non-volatile memory device.

9. The method of claim 1, further comprising:
    determining if each of the attributes in the relations is required by an earlier two-way join among the plurality of pipelined two-way joins,
    in which if an attribute among the attributes in the relations is required by an earlier two-way join among the plurality of pipelined two-way joins, then skipping the attribute and evaluating the attribute at an earlier two-way join among the plurality of pipelined two-way joins.

10. The method of claim 9, further comprising:
    if the attribute is not required by an earlier two-way join among the plurality of pipelined two-way joins, then determining whether the attribute first appears in the two-way join.

11. The method of claim 10, further comprising:
    if the attribute first appears in the two-way join, then:
        assigning the attribute to be materialized during the first phase of the two-way join if the attribute is required for the two-way join; and
        assigning the attribute to be materialized during the second phase of the two-way join if the attribute is not required for the two-way join.

12. The method of claim 10, further comprising:
    if the attribute does not first appear in the two-way join, then:
        determining if the result of the recipient of the two-way join is smaller than the largest input relation in a two-way join where this attribute first appears.

13. The method of claim 12, in which if the result of the recipient of the two-way join is smaller than the largest input relation in a two-way join where this attribute first appears, then assigning the attribute to the second phase of the two-way join.

14. The method of claim 12, in which if the result of the recipient of the two-way join is not smaller than the largest input relation in a two-way join where this attribute first appears, then evaluating whether the attribute first appears in a two-way join preceding the two-way join.

15. A system for performing a multi-way join on a plurality of database relations, said system comprising:
    a non-volatile memory device configured to store said database relations, and;
    a processor communicatively coupled to said non-volatile memory device, said processor comprising volatile memory;
    in which said database management program instructs said processor to execute a plurality of pipelined two-way joins with said relations, each said two-way join comprising a first phase and a second phase;
    in which said first phase of each said two-way join comprises:
        materializing from said non-volatile memory device into said volatile memory any missing attributes in input relations that are required in a joining criterion specific to said two-way join and have not been materialized; and
        joining said input relations according to said criterion; and in which said second phase of each said two-way join comprises:
    materializing from said non-volatile memory device any additional missing attributes in said input relations as assigned by said database management program prior to commencing said multi-way join,
    in which the attributes in the relations are assigned to be materialized at one of the first phase and second phase of the two-way join based on whether the attributes are required for the recipient of the two-way join's result and based on whether the current two-way join requires the attributes, and
    in which the missing attributes comprise any attributes that are required for the result of the two-way join and have not been materialized.

16. The system of claim 15, in which said database relations are stored on said non-volatile memory device in a column-based mini page format.

17. The system of claim 15, in which said non-volatile memory device comprises at least one solid state drive.

18. The system of claim 15, in which said joining said input relations according to said criterion comprises performing at least one of: a hash-join, a sort-merge join, an indexed nested loop, and a nested loop on said input relations.

19. The system of claim 15, in which the database management program instructs the processor to individually assign each attribute in the database relations to be materialized during one of the first and second phases in one of the two-way joins during an optimization process according to a computed minimum time cost in fetching the attribute.

20. The system of claim 19, in which said optimization process is configured to order attribute fetching in said multi-way join according to attribute sizes at each two-way join.

21. The system of claim 19, in which said optimization process is configured to assign said attributes to said two-way joins in a sequential order beginning with a last of said two-way joins to be joined in said multi-way join and ending with a first of said two-way joins to be joined in said multi-way join.

22. A computer program product for performing a multi-way join of a plurality of database relations, said computer program product comprising:
- a non-transitory computer usable medium configured to store computer usable program code, said computer usable program code comprising:
  - computer usable program code to, when executed by a processor, execute an optimization process prior to commencing said multi-way join;
  - computer usable program code to, when executed by a processor, execute a plurality of pipelined two-way joins with said relations, each said two-way join comprising a first phase and a second phase;
- in which said first phase of each said two-way join comprises:
  - materializing from a non-volatile memory device any missing attributes in input relations that are required in a joining criterion specific to said two-way join; and
  - joining said input relations according to said criterion; and
- in which said second phase of each said two-way join comprises:
  - materializing from said non-volatile memory device any additional missing attributes in said input relations as assigned by said optimization process,
- in which the attributes in the relations are assigned to be materialized at one of the first phase and second phase of the two-way join based on whether the attributes are required for the recipient of the two-way join's result and based on whether the current two-way join requires the attributes, and
- in which the missing attributes comprise any attributes that are required for the result of the two-way join and have not been materialized.

23. The computer program product of claim 22, in which said database relations are stored on said non-volatile memory device in a column-based mini page format.

24. The computer program product of claim 23, in which said optimization process is configured to individually assign each attribute in said database relations to be materialized during one of said first and second phases in one of said two-way joins according to a computed minimum time cost in fetching said attribute.

25. The computer program product of claim 22, in which said optimization process is configured to order said fetches according to attribute sizes at each two-way join.

26. The computer program product of claim 22, in which said non-volatile memory device comprises at least one solid state drive.

* * * * *